United States Patent
Kaegi

(10) Patent No.: US 6,863,276 B2
(45) Date of Patent: Mar. 8, 2005

(54) DEVICE FOR SEALING OR REDUCING HOLES, AND CONNECTING HOLES WITH A TUBE END

(75) Inventor: Rene Kaegi, Gruet (CH)

(73) Assignee: The Lee Company, Westbrook, CT (US)

( * ) Notice: Subject to any disclaimer, the term of this patent is extended or adjusted under 35 U.S.C. 154(b) by 0 days.

(21) Appl. No.: 09/973,225

(22) Filed: Oct. 9, 2001

(65) Prior Publication Data

US 2003/0067118 A1 Apr. 10, 2003

(51) Int. Cl.⁷ ............................................... F16L 17/00
(52) U.S. Cl. ..................... 277/314; 277/312; 277/602; 277/606
(58) Field of Search ................................ 277/134, 132, 277/602, 603, 606, 616, 625, 626, 628, 644, 647

(56) References Cited

U.S. PATENT DOCUMENTS

| | | | | |
|---|---|---|---|---|
| 859,733 A | * | 7/1907 | Bot | 285/189 |
| 1,456,145 A | * | 5/1923 | Pecinka | 285/215 |
| 2,058,452 A | * | 10/1936 | Hoffman | 411/371.2 |
| 2,458,817 A | * | 1/1949 | Wolfram | 285/328 |
| 2,729,080 A | * | 1/1956 | Bennett | 248/145.3 |
| 2,781,943 A | * | 2/1957 | Carlstrom | 220/239 |
| 3,038,456 A | * | 6/1962 | Dreisin | 123/470 |
| 3,326,560 A | * | 6/1967 | Trbovich | 277/382 |
| 3,345,078 A | * | 10/1967 | Bialkowski | 277/647 |
| 3,462,161 A | * | 8/1969 | Daubenberger et al. | 277/606 |
| 3,469,490 A | * | 9/1969 | Pearce | 411/371.1 |
| 3,576,335 A | * | 4/1971 | Kowal et al. | 285/233 |
| 3,637,223 A | * | 1/1972 | Weber | 277/608 |
| 3,744,806 A | * | 7/1973 | Keyser | 277/606 |
| 3,915,462 A | * | 10/1975 | Bruns et al. | 277/647 |
| 3,992,974 A | * | 11/1976 | Miki et al. | 411/544 |
| 4,372,565 A | * | 2/1983 | Lien | 277/614 |
| 4,601,475 A | * | 7/1986 | Nicholson | 277/560 |
| 4,958,970 A | * | 9/1990 | Rose et al. | 411/12 |
| 5,203,647 A | * | 4/1993 | Blackwell | 405/259.1 |
| 5,226,683 A | * | 7/1993 | Julien et al. | 285/363 |

* cited by examiner

Primary Examiner—Daniel P. Stodola
Assistant Examiner—Carlos Lugo
(74) Attorney, Agent, or Firm—Philip J. Lee

(57) ABSTRACT

A method and device for sealing or reducing holes or their connection with a tube end or similar fitting is characterized by at least one element with disc shaped surface with a rim smaller than the diameter of the hole to receive the element worth cone or some shaped surface with the wall of the drill hole under axial pressure, possibly with an additional tumbling action, and at least a temporary support of the element, the element of the device being placed into the drill hole and then with axial pressure from outside, e.g. by a punch, possible with an additional tumbling action, at least a radial shift of the disc shaped surface of the element and a press fit with the wall of the drill hole is achieved.

3 Claims, 1 Drawing Sheet

DEVICE FOR SEALING OR REDUCING HOLES, AND CONNECTING HOLES WITH A TUBE END

BACKGROUND OF THE INVENTION

1. Field of the Invention

The presented invention concerns a method and device for sealing or reducing drilled holes or their connection with a tube end or similar connections.

2. Description of Related Art Including Information Disclosed Under 37 CFR 1.97 and 37 CFR 1.98

In practically all technical areas there is a necessity to seal drilled holes such that they are leak-free, e.g. an auxiliary drill hole in the hydraulic or pneumatic branch, or to reduce diameter of the drilled hole for adjusting to new requirements or to connect a drilled hole to a tube end, without having to utilize techniques such as threading, which are susceptible to leakage or which are labor intensive and expensive such as welding or soldering techniques. The latter techniques are often not possible due to the necessary generation of heat.

In a known technique, a drilled hole, e.g. an auxiliary drill hole in the hydraulic- or pneumatic branch, to be sealed without leakage, a stopper cup is inserted into the hole and is expanded by pressing a ball into the open end of the cup. Thus, the cup is radially expanded to press into the wall of the hole thus sealing the hole. In order to reduce a drilled hole by the same method, instead of the stopper cup, closed at the front end, a piece of tubing may be used, and in order to connect the respective drill hole to a tube end, this tube itself has to be expanded into the drill hole.

This technique is expensive, requiring extensive and precise machining, and requires for a leak free press fit of the tubing material at the drill hole walls, a substantial drilling depth and close concentricity between the wall of hole wall and the opposing surface of the device.

BRIEF SUMMARY OF THE INVENTION

The method of the present invention achieves the leak tight seal by axial pressure, possibly with an additional tumbling action. At least one element is inserted into the hole to be sealed, and is at least temporarily supported by a support shoulder or other means. The element has the shape of a disc, which has been formed into a conical or domed shape such that axial pressure tending to flatten or collapse the element causes a radial expansion of the rim of the disc shaped surface to achieve a press fit with the wall of the drilled hole. The element may be formed of a flat disc, washer, or other flat piece having an annular rim, the piece being formed into the element of the present invention in the desired conical shape by placement in a conical die and impacted by a ball or other tool to form the desired cone or dome shape. The shaping process acts to reduce the diameter of the element rim such that the rim will radially expand, returning toward its original diameter when flattened by axial pressure exerted against the apex of the conical shape when opposed by axial force or restraint of the rim. The opposing axial force exerted against the rim may be supplied by a support shoulder, or by an opposing tool.

Furthermore the invention presented concerns a device to seal or reduce drilled holes or connect a tube end or similar material therein. The device is characterized by at least one element with a disc shaped surface with a rim smaller than the diameter of the drilled hole to receive the element, the element having a cone- or dome-shaped configuration to allow a radial expansion of the rim of the disc shaped surface and achieve a press fit with the wall of the drilled hole when axial pressure is applied against the apex of the cone shape, and at least a temporary support of the element. It is possible to simply place the element of the device of the present invention into the hole and then with axial pressure from outside, e.g. by a punch, to flatten the conical or domed shape to achieve a radial expansion of the disc shaped surface of the element and a press fit with the wall of the drilled hole. This method and device has manifold applications and may be adapted for use with a variety of components as well. While the method is useful in applications involving drilled holes, the method and devices referred to herein are equally applicable and useful with holes formed by casting or other methods.

In a further development on the invention, two or more elements can be placed on top of each other in the drill hole with a sealing disc formed of an elastomeric sealing material placed between two elements to be pressed in together.

Furthermore the element of the device of the present invention can be "can" or cup shaped with an outer shoulder ring to sit on the rim of the hole, whereby the bottom of this element forms the disc shaped surface with cone or dome shaped configuration with the apex of the cone or peak of the dome projecting in the direction of the rim. In this arrangement the outer shoulder ring replaces the support shoulder mentioned above. A punch can be used directly to press down and thus flatten the element bottom and the element can be filled with a formable material such as lead.

In a further development of the invention, in a device of the present invention, the element can be configured as a perforated disc or a disc with a center hole, or as a tube section or a threaded bolt with a flange which forms the disc shape surface with cone or dome shaped configuration.

In another development of the device of the present invention the element can show a cone or dome shaped configuration circumferentially close to the rim, whereby an annulus of material is projected above the surface of the element, with a outer frusta-conical surface and an inverted frusta-conical inner surface. The method of the present invention may be further applied to configure the flanged end of a tube as the conical element, which, when flattened by axial force on the tube and axial restraint of the flange rim, will radially expand the flange rim into a press fit. This result can also be achieved using a conically shaped, perforated disc for a connection with a tube end, whereby, under pressure, a radial expansion and a press fit of the rim of the disc is achieved with the wall of the hole and of the edge of the perforation of the disc with the cylindrical wall of the tube end.

In yet a further development of the device of the present invention the element can be a a folded annulus having two frusta-conical surfaces inverted with respect to each other and formed of one piece, such that axial pressure applied to top and bottom rims in opposing directions will flatten and radially expand the element. An elastomeric material may be retained axially between the opposing surfaces and squeezed into sealing contact with the hole wall when the element is flattened.

The principal aim of the present invention is to provide a new and improved method and devise for sealing or reducing a hole or connecting a component which meets the foregoing requirements and which is capable of being easily installed in a hole or bore.

Another and further object and aim of the present invention is to provide a new and improved method and devise for sealing or reducing a hole or connecting a component which meets the foregoing requirements and which is economical to manufacture and to provide an economical method of manufacture and installation.

Yet another and further object and aim of the present invention is to provide a new and improved method and devise for sealing or reducing a hole or connecting a component which meets the foregoing requirements and which can be installed in either direction.

Other objects and advantages of the invention will become apparent from the Description of the Preferred Embodiments and the Drawings and will be in part pointed out in more detail hereinafter. The invention consists in the features of construction, combination of elements and arrangement of parts exemplified in the construction hereinafter described and the scope of the invention will be indicated in the appended claims.

DETAILED DESCRIPTION OF THE INVENTION

Figure 1:
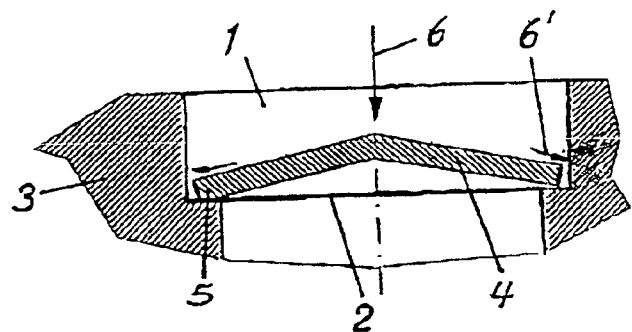
FIG. 1 is a cross section view of a preferred embodiment of a device constructed in accordance with the present invention placed in a circular hole, but not fully installed therein.
Figure 2:
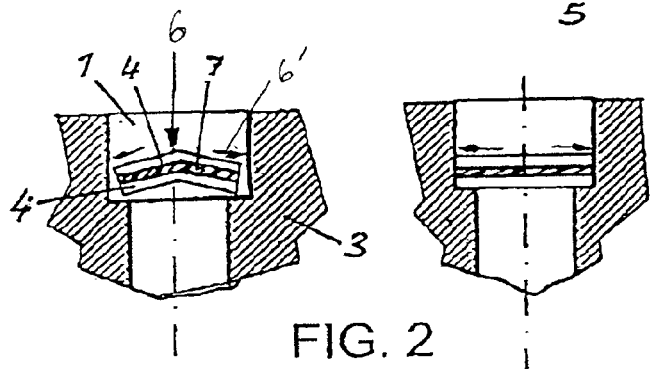
FIG. 2 comprises two cross section views of another preferred embodiment of a device constructed in accordance with the present invention, which, on the left hand has been placed in a circular hole, but not fully installed therein, and on the right hand has been fully installed.
Figure 3:
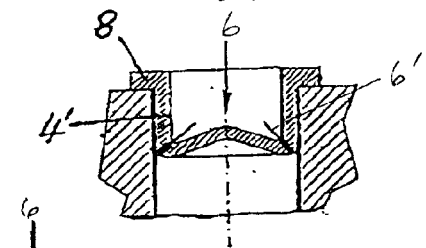
FIG. 3 is a cross section view of another preferred embodiment of a device constructed in accordance with the present invention placed in a circular hole, but not fully installed therein.
Figure 4:
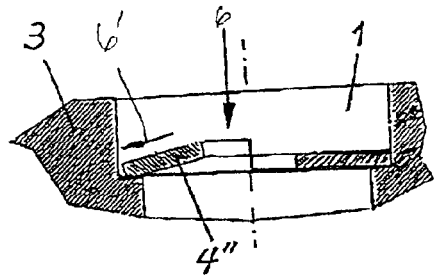
FIG. 4 is a split cross section view of another preferred embodiment of a device constructed in accordance with the present invention, which, on the left hand has been placed in a circular hole, but not fully installed therein, and on the right hand has been fully installed.
Figure 6:
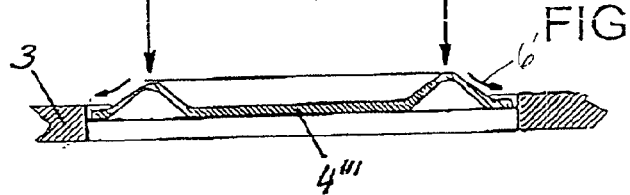
FIG. 6 is a cross section view of another preferred embodiment of a device constructed in accordance with the present invention placed in a circular hole, but not fully installed therein.
Figure 7:
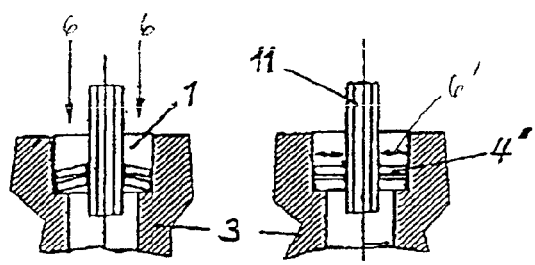
FIG. 7 comprises two cross section views of another preferred embodiment of a device constructed in accordance with the present invention, which, on the left hand has been placed in a circular hole, but not fully installed therein, and on the right hand has been fully installed.
Figure 8:
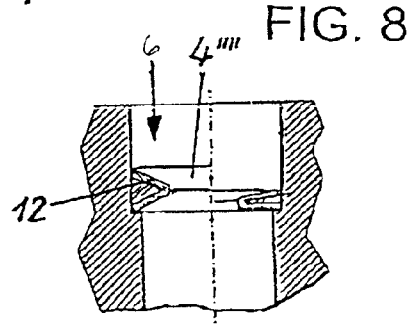
FIG. 8 is a split cross section view of another preferred embodiment of a device constructed in accordance with the present invention, which, on the left hand has been placed in a circular hole, but not fully installed therein, and on the right hand has been fully installed.

The Drawings show a variety of configurations of devices constructed in accord with the present invention, all of which have in common a round disc shaped element configured with a conical, frusta-conical or dome shaped surface, which elements are designated by the numeral 4 in FIGS. 1 and 2, by the numeral 4' in FIG. 3, by the numeral 4" in FIGS. 4 and 7, by the numeral 4'" in FIG. 6, and by the numeral 4"" in FIG. 8. The present invention being directed to sealing, reducing or securing a tube to a hole in a boss, the drawings are oriented such that the top of the drawings correspond to the outside of the hole and the bottom corresponds to the inside of he hole, and directions such as up, top, down or bottom derive their meaning accordingly. In the drawings, the general point of application, and direction of axial pressure is indicated by the arrows designated by the numeral 6, and the arrows designated by the numeral 6' indicate the direction of radial expansion of the rim of the device.

FIG. 1 shows a round disc shaped element 4 of the device per invention manufactured from steel or similar material in a round drill hole 1 with inner support shoulder 2 in a metallic body 3, e.g. an engine block, to seal the drill hole 1. The element 4 in this case is smaller in diameter that the diameter of the drill hole 1 and of dome shaped configuration. Arrows 6' show the direction of the radial shift and press fit of the rim zone 5 of the disc shaped element 4 with the wall of the drill hole 1 upon application of an axial pressure on the disc shaped element 4 as shown by arrow 6. Said axial pressure is exerted by a suitable punch (not shown), perhaps with an additional tumbling action. If in such a configuration the named support shoulder 2 is missing, at least the rim 5 of the element 4 has to be at least temporarily supported, e.g. by a suitable counter punch (not shown).

According to FIG. 2, two or more elements 4 can be placed in the drill hole on top of each other (picture left) and then can be pressed in together (picture right). For an absolute sealing it is advantageous if additionally a sealing disc 7 of an elastomeric sealing material is provided between two outer elements 4.

In a further development of the present invention, as shown in FIG. 3, the element 4' of the device is configured in a can or cup shape with an outside shoulder 8 to sit on the rim of the hole, whereby the bottom of this element 4' forms the disc shaped surface with cone or dome shaped configuration. In this arrangement the ring shoulder 8 restrains the rim of the conical surface and replaces the support shoulder 2 mentioned before. The axial pressure in this case can be performed again by means of a punch directly and/or by filing the element 4' with a formable material, such as lead (not shown).

In the arrangement shown in FIG. 4 the element 4' in comparison to FIG. 1 is configured as a perforated disc to reduce drill holes.

Figure 5:
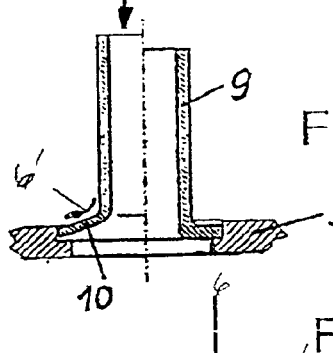
FIG. 5 is a split cross section view of another preferred embodiment of a device constructed in accordance with the present invention, which, on the left hand has been placed in a circular hole, but not fully installed therein, and on the right hand has been fully installed.

In the arrangement shown in FIG. 5 the element is a tube section 9 or a threaded bolt with a flange 10 forming the disc shaped surface with cone or dome shaped configuration. This allows especially a very flat construction, e.g. a front plate, to which a tube connection or the assembly of a printed circuit boards has to be provided.

A further variation of the configuration is shown in FIG. 6, whereby the element 4'" of the device per invention shows a cone or dome shaped configuration circumferentially close to the rim. Element 4'" comprises a radially outer portion in a frusta-conical shape with the base downward and an adjoining radially inner portion in a frusta-conical shape with the base upward, and a central flat section.

A further variation of the configuration is shown in FIG. 7 whereby for connecting the drill hole 1 with a tube end 11, e.g. a tube nipple, the element 4" of the device of the present invention has a central perforation similar to that shown in FIG. 4, and can be used either singly or plurally as shown in the arrangement in FIG. 2. Under axial pressure, a radial shift and press fit of the rim zone of the disc shaped surface with the wall of the installation hole is achieved, as is a press fit of the hole edge of the disc shaped surface with the cylinder wall of the tube end 11.

Furthermore the element 4"" of the device per invention may be a perforated disc per FIG. 8 with a cone or dome shaped circumferential rim zone 12. Element 4"" is formed of an annular piece comprising two coaxial frusta-conical surfaces, the bases of which correspond to the rim zone, and contact the hole wall, the bottom surface angling inwardly upward and the top surface angling inwardly downward. A gap exists between the two surfaces before installation, which gap may receive an elastomeric seal material. Upon application of axial pressure according to arrow 6, the two surfaces flatten and the rims thereof approach each other while radially expanding to a press fit in the hole.

The method of the present invention comprises the sealing, reducing, or connecting a component to an installation hole by forming a device with a conical or dome shaped element with a radially outer rim, and at least temporarily supporting at least said rim by a support shoulder or other means, and applying axial pressure to the element in opposition to the rim support, possibly with an additional tumbling action. The element has the shape of a disc, which has been formed into a conical or domed shape such that the axial pressure tends to flatten or collapse the element causing a radial expansion of the rim, thereby achieving a press fit with the wall of the installation hole. The element may be formed of a flat disc, washer, or other flat piece having an annular rim, the piece being formed into the conical or frusta-conical element of the present invention in the desired conical shape by placement in a conical die and impaction by a ball or other tool to form the desired cone or dome shape. The insertion of a tube or other component into a central opening in the element can achieve a press fit of the tube within the element. While the drawings and description uniformly describe the axial pressure exerted from above upon the peak or apex of the conical element with opposing force supporting the rim exerted upward, it will be anticipated that the direction and area of application of these forces could be reversed so long as the forces are opposing.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

I claim:

1. A device to reduce a hole having a wall of surrounding material, a central axis, and a predetermined inside diameter, the device comprising a first frustaconical surface of generally uniform thickness, having a base and a top, with a radially outer planar rim forming the base with a smaller diameter than the hole and a central opening at the top, the rim being of greater diameter than, and concentric with, the central opening, and a second frustaconical surface the same shape as the first surface with a central opening the same diameter as the first surface opening and a base forming a radially outer planar rim the same diameter as the first surface rim, the second surface being inverted with respect to the first surface such that the first and second surfaces are joined proximate to the central opening of each surface and the rims of each surface are axially separated, the outer rims being engageable with the wall of the hole such that when the device is positioned in the hole with the planes of the rims normal to the axis of the hole and one rim is supported in a first axial direction, upon application of axial force applied in a second opposing axial direction to the other rim, the axial separation of the rims is reduced and the rims are expanded radially outward to engage the hole wall.

2. A device in accord with claim 1, wherein the element further comprises an annulus of elastomer inserted and retained between the first and second surfaces.

3. A device for sealing a hole having a wall of surrounding material, a central axis, and a predetermined inside diameter, the device comprises a cone or dome shaped continuous surface formed as a transverse bottom at a first end of a cylinder, the surface being of generally uniform thickness and having a radially outer, annular and planar rim smaller than the diameter of the hole, the surface rim being attached to the first end of the cylinder and the other, second end of the cylinder comprising a radially outwardly projecting shoulder having a greater diameter than the hole, the apex of the surface being raised relative to the surface rim in a first axial direction toward the second cylinder end, and the rim is supported in the first direction by the cylinder and rim has a large enough diameter relative to the diameter of the hole that upon application of an axial force applied in to the central apex in a second axial direction opposite to the first direction, the surface is flattened to span and seal the hole and the rim is expanded radially outward to engage the hole wall.

* * * * *